W. T. WOOD & A. D. KNOX.
LAWN MOWER.
APPLICATION FILED APR. 29, 1910.
1,002,550.
Patented Sept. 5, 1911.
2 SHEETS—SHEET 1.
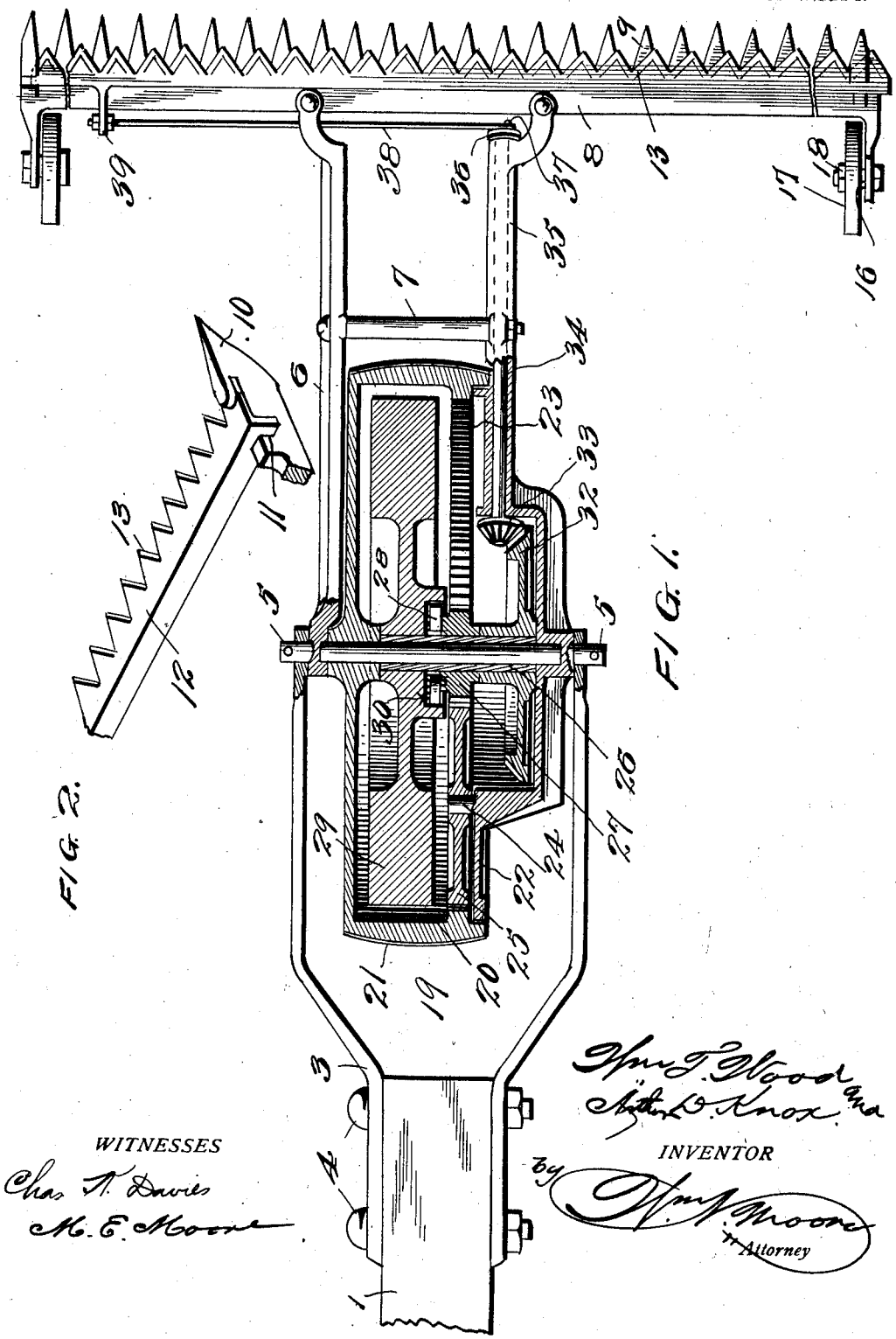

W. T. WOOD & A. D. KNOX.
LAWN MOWER.
APPLICATION FILED APR. 29, 1910.
1,002,550.
Patented Sept. 5, 1911.
2 SHEETS—SHEET 2.
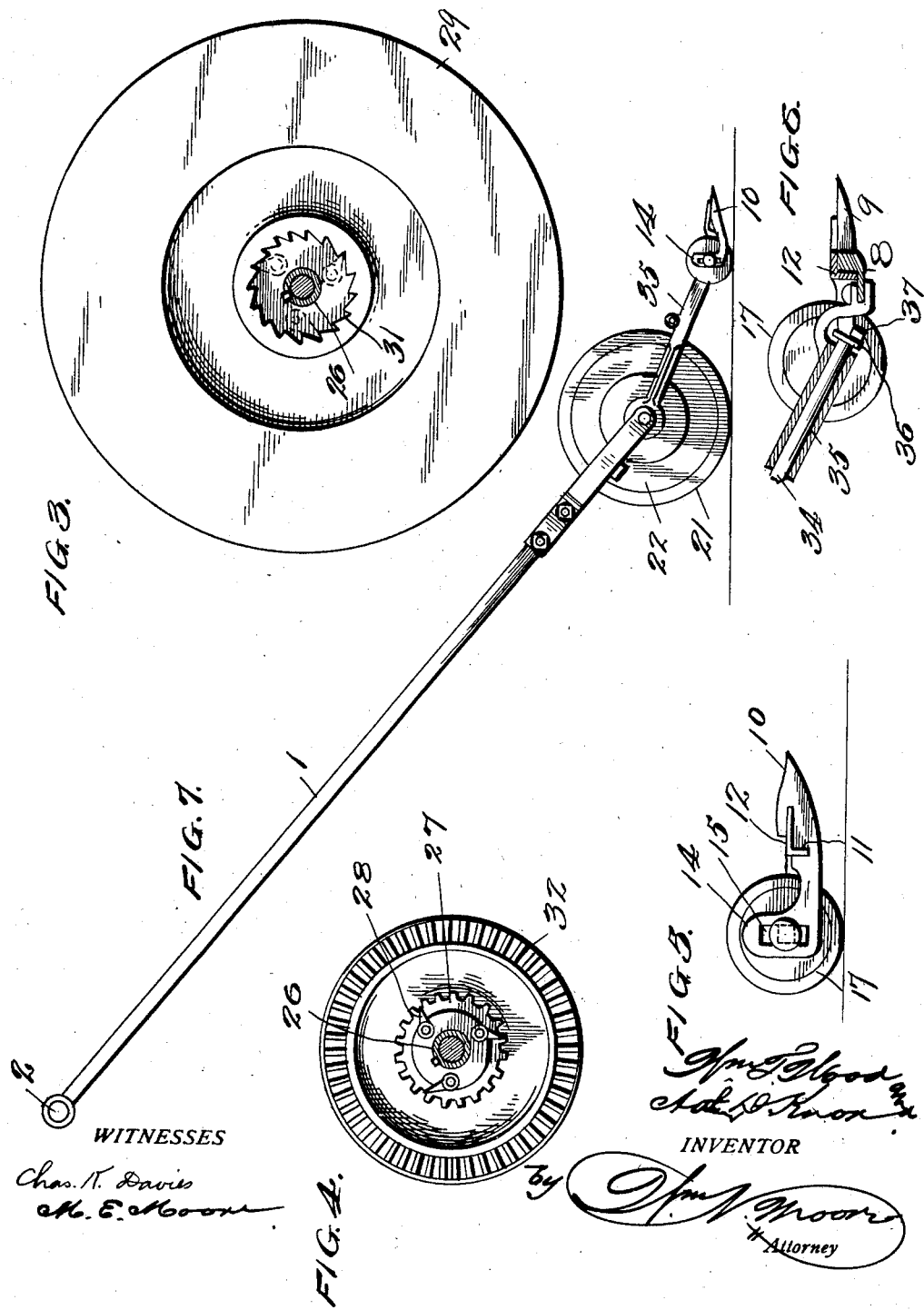

UNITED STATES PATENT OFFICE.

WILLIAM T. WOOD AND ARTHUR D. KNOX, OF NASHVILLE, TENNESSEE.

LAWN-MOWER.

1,002,550. Specification of Letters Patent. Patented Sept. 5, 1911.

Application filed April 29, 1910. Serial No. 558,486.

*To all whom it may concern:*

Be it known that we, WILLIAM T. WOOD and ARTHUR D. KNOX, citizens of the United States, residing at Nashville, in the county of Davidson and State of Tennessee, have invented certain new and useful Improvements in Lawn-Mowers, of which the following is a specification.

Our invention relates to improvements in lawn mowers, and the object of our invention is the provision of a mower of compact form adapted for use in mowing lawns which will prove of the highest efficiency and which will quickly and evenly cut the grass regardless of the height thereof.

A further object of our invention is the provision of an improved form of mower which will be strong and simple of construction and which will possess merit in point of durability and cheapness and in efficiency of operation.

To attain the desired objects, our invention consists in a lawn mower having a reciprocating cutting blade and means for forcefully driving said blade which will cause the same to cut clear when the machine is suddenly stopped, the invention further residing in the novel features of construction and combination and arrangement of parts for service substantially as described and as illustrated in the accompanying drawings.

Figure 1 represents a top plan view of our mower with the operating mechanism shown in section. Fig. 2 represents a perspective view of the end section of the lower blade member with a part of the upper blade mounted thereon. Fig. 3 represents a side elevation of the fly wheel. Fig. 4 represents a side elevation of the driving pinion and bevel gear wheel. Fig. 5 represents an enlarged end view of the blade and supporting wheel. Fig. 6 represents a detailed view of the driving shaft, and, Fig. 7 represents a side elevation of our complete mower.

In the drawings, in which similar characters of reference are employed to denote corresponding parts in the several views, the numeral 1 designates the tongue or handle portion of the machine having at one end the grips 2 and at the other the clevis forming plates or bars 3, said bars being secured to the handle by the bolts 4. Secured at the ends of the bars 3 is the axle 5 upon which is mounted adjacent the bars the frame bars 6 provided intermediate their length with the cross-brace 7, while secured to the lower end of said frame bars is the angle plate 8 having the forwardly projecting teeth 9, the end teeth 10 extending upward above the face of the plate and having the slot 11 formed therein in which moves the reciprocating blade 12, said blade being of L-shape and fitting over the rear and upper faces of the plate 8 and having teeth 13 projecting partly over but of less length than the teeth 9 of the lower blade. The plate 8 is provided at each end with an L-shaped lug 14 having a slot 15 formed in its upright portion, while projecting through said slot and secured in adjusted position therein is the axle 16 of the guide wheel 17, said axle being secured in adjusted position by the clamp nut 18 engaged on the end of the axle and bearing against the lug 14.

Mounted in the frame on the axle 5 is the supporting and driving wheel of our mower which is designated as a whole by the numeral 19, said wheel consisting of the hollow shell 20 having the tread surface 21 and provided with the cap or end member 22 adapted to serve as a closure for the shell 20, the shell 20 having formed on the inner side of the tread portion the internal gear 23 while the cap member 22 is provided with a stud or pintle 24 on which is mounted the idler gear 25 which is in mesh with and rotated by the gear 23 upon the movement of the wheel 19. Loosely mounted upon the portion of the axle included in the shell of the wheel 19 is a sleeve 26 having loosely mounted upon its middle portion the pinion 27, said pinion being in mesh with and rotated by the idler gear 25 and being provided with a series of pawls 28.

Secured to one end of the sleeve 26 is the fly wheel 29, said wheel 29 having a socket 30 formed in the side adjacent the pinion and having an interior row of ratchet teeth 31 around the edge of the socket, said teeth being adapted to be engaged by the pawls 28 to lock the fly wheel and pinion together upon the forward movement of the machine while allowing the pinion to move freely without disturbing the fly wheel when the mower is drawn backward, this arrangement moreover allowing the sleeve and fly wheel to continue their forward movement when the wheel 19 is stationary. Secured to the other end of the sleeve and driven thereby is a beveled gear wheel 32 which is in mesh with and drives the beveled pinion 33 on the shaft 34, said shaft extending forward in the tubular casing 35 secured to the frame bar 6, while secured to the lower end of said shaft is a disk 36 bearing an eccentric pin 37 to which is pivotally secured one end of the flexible link 38, the other end of the link being secured to the rearwardly projecting ear or lug 39 carried by the blade 12, the rotation of the shaft caused by the beveled gear serving to shift the link and reciprocally move the blade to cause the latter to cuttingly engage the grass or other material therebefore.

From the foregoing description taken in connection with the drawings the construction and operation of our improved mower will be readily understood and its advantages be apparent to all and it will be seen that upon the forward movement of mower upon its single supporting wheel the rotation of said wheel through the medium of the internal gears, the idler, and the pinion with its pawls serve to rotate the fly wheel and its sleeve which in turn through the beveled gears revolve the driving shaft to reciprocate the blade, while when the forward points of the lower blade or any other portion of the mower strikes an obstruction which stops the same the heavy fly wheel will on account of its size continue to rotate driven by the inertia of its movement and will thus momentarily continue to reciprocate the upper blade with its shorter teeth and cut away all with which said blade is in contact, and it will further be seen that the longer lower teeth are of great advantage in that they strike the obstructions and prevent the same from coming into contact with the moving blade. It will be further understood that the adjustment of the wheels 17 serves to adjust the distance above the ground at which the blades are held and thus the cut of the mower and that we can set the same to cut at any desired height and that the mower will cut all heights of grass or like substances with like facility. It will also be understood that a great advantage is gained in a mower of this type in placing the supporting wheel in the center of the frame and having but a single wheel instead of a pair of wheels as is customary, since by this construction the mower may be run closely along walls or fences and into corners without the wheels in any way interfering with the operation of the mower.

We claim:

1. A mower, comprising a frame, a shaft therein, a shell wheel mounted on said shaft and having gear teeth formed on the interior of the shell portion thereof, a sleeve mounted on the axle and bearing a gear wheel on one end and a fly wheel on the other end, said gear and fly wheels being secured on the sleeve to rotate therewith, a pinion loosely mounted on the sleeve, means operatively connecting said pinion with the gear teeth of the main wheel, and a ratchet clutch for operatively connecting the pinion with the fly wheel for driving the latter and thus the gear on the other end of the sleeve and a cutting device operatively connected to said gear and operated by the revolution thereof.

2. In a lawn mower, the combination with a frame, of an axle mounted therein, a shell wheel mounted on the axle and provided with interior gears, a cap for the shell provided with a stud, a sleeve mounted on the axle inside the shell and provided with fly and gear wheels at opposite ends, said gear and fly wheels being secured on the sleeve to rotate therewith, a pinion loosely mounted on the sleeve, means for operatively connecting the pinion with the fly wheel upon the forward movement of the mower, a cutting device, connections between the gear wheel and the cutting device, and an intermediate gear mounted on the stud of the cap and connecting the interior gear of the shell with the pinion for driving the latter to operate the mower.

In testimony whereof we affix our signatures in presence of two witnesses.

WILLIAM T. WOOD.
ARTHUR D. KNOX.

Witnesses:
Wm. A. Shield,
R. W. Yamey.

Copies of this patent may be obtained for five cents each, by addressing the "Commissioner of Patents, Washington, D. C."